(12) United States Patent
Wittmann

(10) Patent No.: US 8,881,529 B2
(45) Date of Patent: Nov. 11, 2014

(54) MODULAR FUEL SUPPLY DEVICE FOR A GAS TURBINE INCLUDING A FUEL SUPPLY DEVICE HAVING AN INTEGRATED CONTROL DEVICE

(75) Inventor: Peter Wittmann, Ottobrunn (DE)

(73) Assignee: MTU Aero Engines GmbH, Munich (DE)

( * ) Notice: Subject to any disclaimer, the term of this patent is extended or adjusted under 35 U.S.C. 154(b) by 1315 days.

(21) Appl. No.: 12/297,935

(22) PCT Filed: May 9, 2007

(86) PCT No.: PCT/DE2007/000823
§ 371 (c)(1),
(2), (4) Date: Apr. 13, 2009

(87) PCT Pub. No.: WO2007/134568
PCT Pub. Date: Nov. 29, 2007

(65) Prior Publication Data
US 2010/0064658 A1    Mar. 18, 2010

(30) Foreign Application Priority Data

May 18, 2006    (DE) .......................... 10 2006 023 237

(51) Int. Cl.
| F02C 1/00 | (2006.01) |
| F02C 7/224 | (2006.01) |
| F02C 7/236 | (2006.01) |
| F02C 7/14 | (2006.01) |
| F02C 9/26 | (2006.01) |

(52) U.S. Cl.
CPC . *F02C 9/26* (2013.01); *F02C 7/224* (2013.01); *Y02T 50/675* (2013.01); *F02C 7/236* (2013.01); *F02C 7/14* (2013.01)
USPC .......................... 60/734; 60/39.27; 60/39.281

(58) Field of Classification Search
USPC ........ 60/39.281, 39.27, 734, 741; 417/18, 26, 417/44.1
See application file for complete search history.

(56) References Cited

U.S. PATENT DOCUMENTS

| 3,596,467 | A |   | 8/1971  | Avery |
| 4,124,878 | A | * | 11/1978 | Ebner et al. ................... 361/802 |
| 4,212,443 | A | * | 7/1980  | Duncan et al. ................ 244/177 |
| 4,248,040 | A | * | 2/1981  | Kast ........................... 60/39.281 |
| 4,408,961 | A | * | 10/1983 | Laybourne .................... 417/189 |
| 4,785,403 | A | * | 11/1988 | Kuhlberg ........................ 701/14 |
| 4,877,972 | A | * | 10/1989 | Sobhani et al. ................. 307/43 |
| 5,150,568 | A |   | 9/1992  | White ............................. 60/797 |
| 5,339,636 | A | * | 8/1994  | Donnelly et al. ............... 60/734 |
| 5,627,758 | A | * | 5/1997  | Lansberry et al. .............. 702/57 |
| 5,670,856 | A | * | 9/1997  | Le et al. ......................... 318/564 |
| 6,745,558 | B2 | * | 6/2004 | Murakami et al. .......... 60/39.281 |
| 6,845,306 | B2 | * | 1/2005 | Henry et al. ................. 701/29.6 |
| 6,996,970 | B2 | * | 2/2006 | Lorenz ....................... 60/39.281 |
| 7,540,141 | B2 | * | 6/2009 | Goldberg et al. .......... 60/39.281 |
| 2005/0284149 | A1 | * | 12/2005 | Jansen et al. .................... 60/734 |
| 2007/0130911 | A1 |   | 6/2007  | Goldberg et al. |
| 2009/0199823 | A1 | * | 8/2009 | Mahoney et al. ............. 123/497 |

FOREIGN PATENT DOCUMENTS

WO    WO 94/20739    9/1994

* cited by examiner

*Primary Examiner* — Phutthiwat Wongwian
*Assistant Examiner* — Lorne Meade
(74) *Attorney, Agent, or Firm* — Greer, Burns & Crain, Ltd.

(57) ABSTRACT

A gas turbine, in particular a gas turbine aircraft engine, including a fuel supply device and a control device, wherein at least parts of the control device, in particular of an engine control device, are integrated into the fuel supply device.

11 Claims, 1 Drawing Sheet

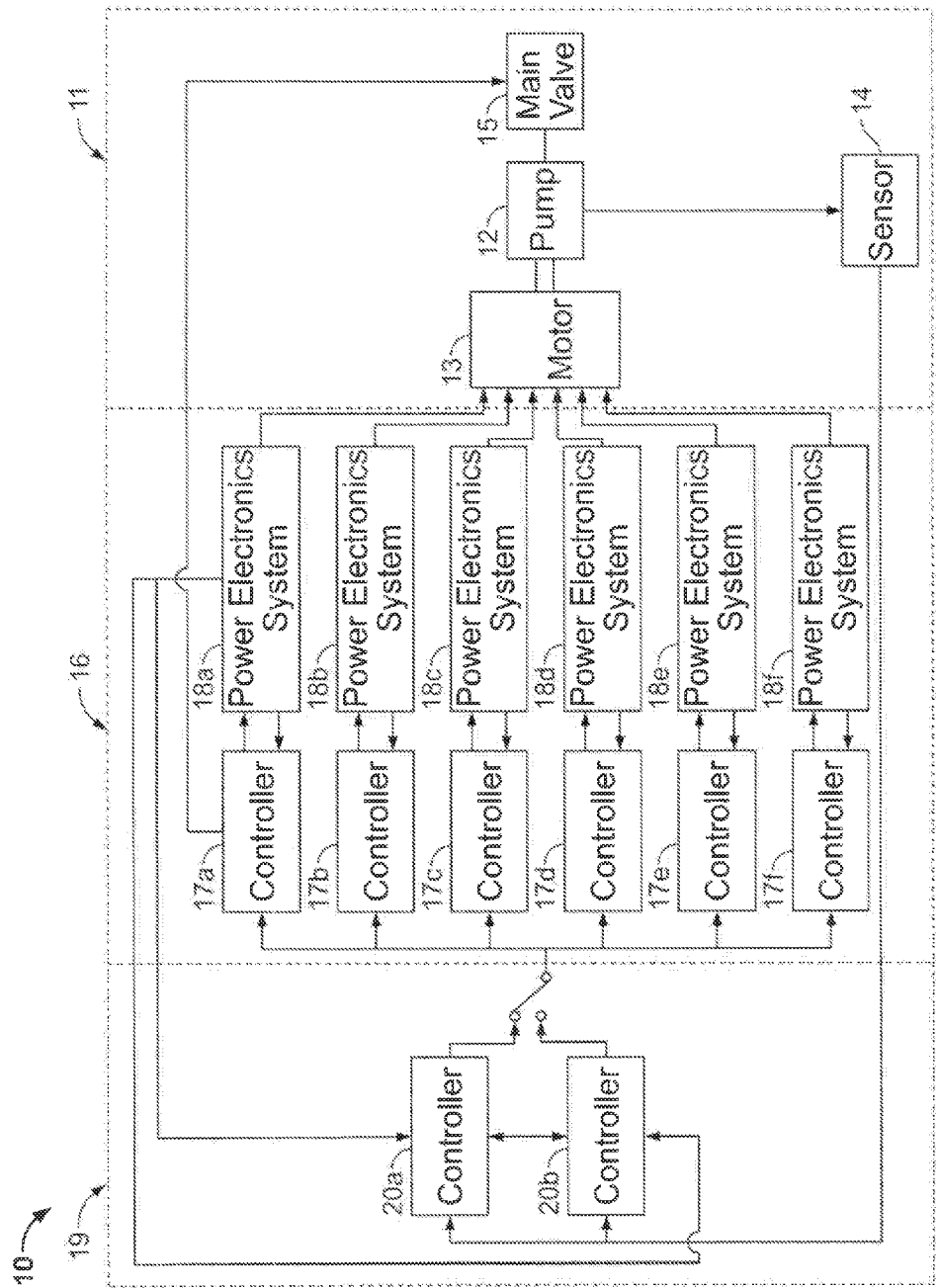

MODULAR FUEL SUPPLY DEVICE FOR A GAS TURBINE INCLUDING A FUEL SUPPLY DEVICE HAVING AN INTEGRATED CONTROL DEVICE

BACKGROUND

The present invention relates to a gas turbine, in particular a gas turbine aircraft engine.

Known gas turbine aircraft engines have a fuel supply device for supplying fuel to a combustion chamber of the gas turbine aircraft engine, as well as a central engine control device with the aid of which the operation of the gas turbine aircraft engine can be controlled.

A multiplicity of sensors and actuators are connected to the central engine control device, resulting in a high cabling expense between the central engine control device and the sensors and actuators distributed on the gas turbine aircraft engine.

In known gas turbine aircraft engines, the fuel supply device typically has two pumps that are mechanically driven by a gearbox of the gas turbine aircraft engine. The quantity of fuel conveyed by each pump is proportional to the rotational speed of the gas turbine aircraft engine, which in some operating states can result in a large recirculation flow of fuel.

Against this background, the present invention is based on the problem of creating a new type of gas turbine, in particular a new type of gas turbine aircraft engine.

SUMMARY

This problem is solved by a gas turbine where at least parts of the control device are integrated into the fuel supply device.

It is proposed according to the present invention to integrate at least parts of the engine control device into the fuel supply device. This decentralizes functions of the engine control device, creating a distributed control system. In this way, the cabling expense between the distributed engine control device and the sensors and actuators that are to be connected thereto can be reduced to a minimum.

According to an advantageous development of the present invention, the fuel supply device has a motor-pump unit having one or more (preferably two) pump(s) and one or more electric motor(s) that drive the pump(s), as well as a respective motor control unit for controlling the operation of the electric motor(s) of the motor-pump unit, the parts of the engine control device integrated into the fuel supply device forming an engine control unit for controlling the operation of the motor control unit. Due to the fact that the fuel supply device has one or more pump(s) driven by electric motors, with the aid of the control functions integrated into the fuel supply device the supply of fuel to the combustion chamber of the gas turbine can be precisely controlled as a function of the operating state, making it possible to minimize a recirculation flow in the gas turbine and losses of efficiency caused thereby.

Preferably, the motor-pump unit, the motor control unit, and the engine control unit are each fashioned as line replaceable units that can be coupled via plug connectors to form an integral assembly that can be exchanged in an installed gas turbine.

Preferred development of the present invention result from the subclaims and from the following description. Exemplary embodiments of the present invention are explained in more detail on the basis of the drawing, without being limited thereto.

BRIEF DESCRIPTION OF THE DRAWINGS

FIG. 1 shows a schematic representation of a fuel supply device of a gas turbine according to the present invention.

DETAILED DESCRIPTION

The present invention relates to a gas turbine, preferably a gas turbine aircraft engine. A gas turbine has at least one compressor, at least one combustion chamber, and at least one turbine. The combustion chamber can be supplied with fuel that is to be combusted via a fuel supply device in the combustion chamber. The function of the gas turbine can be controlled by a control device that, in gas turbine aircraft engines, is called an engine control device.

According to the present invention, it is proposed to integrate parts of the control device into the fuel supply device, in the sense of a decentralized control system. This is explained in detail with reference to the preferred exemplary embodiment shown in FIG. 1.

FIG. 1 shows a schematic representation of a fuel supply device 10 of a gas turbine aircraft engine. Fuel supply device 10 in FIG. 1 has a motor-pump unit 11 having at least one pump 12, pump 12 being driven or operated by an electric motor 13. In addition, according to FIG. 1 motor-pump unit 11 of fuel supply device 10 has a sensor 14 and a main valve 15, such that a measurement value can be acquired with the aid of sensor 14 on pump 12, and with the aid of main valve 15 the flow of fuel to the combustion chamber of the gas turbine aircraft engine can be blocked or enabled. A respective motor control unit 16 that is integrated into fuel supply device 10 is used to control the operation of the at least one electric motor 13 of motor-pump unit 11. Motor control unit 16 has a plurality of controllers 17a-17f that operate in parallel, separate power electronics systems 18a-18f being allocated to each controller 17. In the depicted exemplary embodiment, each power electronics system 18a-18f is allocated to a controller 17a-17f provides 20% of the maximum power for fuel supply device 10, so that after the failure of a power electronics system 100% power is always still available, thus ensuring reliability. Should two of the controllers 17a-17f and their associated power electronics systems 18a-18f fail, the power is limited to 80% of the maximum power. In addition to motor-pump unit 11 and motor control unit 16, an engine control unit 19 is integrated into fuel supply device 10 according to FIG. 1. Engine control unit 19 is either the complete engine control device or parts thereof.

According to the exemplary embodiment depicted in FIG. 1, the engine control unit 19 integrated into fuel supply device 10 has two controllers 20a and 20b that operate redundantly. Controllers 20a and 20b of engine control unit 19 control the operation of motor control unit 16, redundantly providing all the safety functions for fuel supply device 10. Each controller 20a and 20b is made up of at least two computing units, one computing unit performing the controlling and the other performing the monitoring. If a malfunction is determined, a changeover takes place to the redundant controller 20a or 20b.

According to FIG. 1, measurement signals provided by sensor 14 are supplied to the two controllers 20a and 20b of engine control unit 19. Output signals of power electronics systems 18a-18f of motor control unit 16 are also supplied to controllers 20a and 20b of engine control unit 19.

Motor-pump unit 11, the motor control unit 16, and the engine control unit 19 are preferably fashioned as modules that can be coupled via plug connectors, the modules being capable of being coupled via the plug connectors in order to form an integral fuel supply device 10. This reduces the required cabling expense to an absolute minimum. Motor-pump unit 11, motor control unit 16, and engine control unit 19 of fuel supply device 10 are what are known as line replaceable units, which can be exchanged in modular fashion when performing repair operations on an installed gas turbine or an installed gas turbine aircraft engine.

Motor control unit 16 of fuel supply device 10 is preferably fuel-cooled. The cooling of engine control unit 19 takes place via motor control unit 16 (conduction cooling).

As already mentioned, engine control unit 19 can be either the complete engine controller or parts thereof. If engine control unit 19 comprises only parts of the engine controller, other parts of the engine control device are distributed around the gas turbine aircraft engine, such as for example one or more signal-conditioning or signal-processing units, as well as one or more intelligent actuators for e.g. electrical adjustment of guide vanes of the gas turbine aircraft engine. The distributed parts of the engine control device can then be coupled via at least one data bus.

What is claimed is:

1. A gas turbine the gas engine comprising:
    a fuel supply device;
    an engine control device including parts that are contained in and form the fuel supply device, the parts of the engine control device forming an engine control unit;
    a motor-pump unit including at least one pump, at least one electric motor and at least one motor control unit configured for controlling the operation of said at least one electric motor,
    wherein said engine control unit is configured for controlling the operation of said at least one motor control unit, and
    wherein said at least one motor control unit comprises a plurality of activated controllers that operate in parallel, each of said activated controllers including a power electronics system providing a portion of the power to said motor-pump unit based on at least one control signal provided by said engine control unit such that when one of the controllers fails, full power is still provided to said motor-pump unit by the combined power provided by the remaining activated controllers and when two of the activated controllers fail, the remaining of the activated controllers supply power to said motor pump unit up to 80% of full power.

2. The gas turbine as recited in claim 1, wherein the motor-pump unit, the at least one motor control unit, and the engine control unit are each fashioned as modules coupled to each other via plug connectors to form an integral assembly.

3. The gas turbine as recited in claim 1, wherein the motor-pump unit, the at least one motor control unit, and the engine control unit are fashioned as line replaceable units that can be exchanged in an installed gas turbine.

4. The gas turbine as recited in claim 1, wherein said controllers are configured for controlling the operation of the at least one motor control unit on the basis of at least one measurement quantity of at least one sensor integrated into the motor-pump unit.

5. The gas turbine as recited in claim 2, wherein the motor-pump unit, the at least one motor control unit, and the engine control unit are each fashioned as line replaceable units that can be exchanged in an installed gas turbine.

6. The gas turbine as recited in claim 3, wherein said controllers are configured for controlling the operation of the at least one motor control unit on the basis of at least one measurement quantity of at least one sensor integrated into the motor-pump unit.

7. A gas turbine the gas engine comprising:
    a fuel supply device formed by a plurality of modules coupled together, one of said modules being an engine control device,
    said fuel supply device including at least one pump and at least one electric motor configured to drive said at least one pump, wherein said at least one pump and said at least one electric motor form a motor-pump unit,
    said fuel supply device further including at least one motor-regulating unit that controls the operation of said at least one electric motor, said at least one motor-regulating unit including a plurality of activated regulators that operate in parallel and control the operation of said motor-pump unit, wherein each of said activated regulators delivers a portion of the motor power generated by said at least one electric motor such that in an event of failure of one of said regulators, the full motor power is still delivered to said electric motor by the combined power delivered by the remaining activated regulators and when two of the regulators fail, the remaining of the activated regulators supply power to said electric motor up to 80% of full power.

8. The gas turbine of claim 7, wherein said engine control device module in said fuel supply device forms an engine-regulating unit configured to control an operation of said at least one motor-regulating unit.

9. The gas turbine of claim 8, wherein said motor-pump unit, said at least one motor-regulating unit and said engine-regulating unit are each formed as modules that are coupled together to form an integral assembly.

10. The gas turbine of claim 7, wherein said motor-pump unit, said at least one motor-regulating unit and said engine-regulating unit are each formed as line replaceable units that are exchanged when the gas turbine is assembled.

11. The gas turbine of claim 8, wherein said engine-regulating unit includes a plurality of redundantly operating regulators, each of said regulators including a first computing unit for regulation and a second computing unit for monitoring, said first and second computing units configured to control and regulate the operation of said at least one motor-regulating unit based on at least one measured variable of at least one sensor integrated into said motor-pump unit.

\* \* \* \* \*